(12) United States Patent
Teken et al.

(10) Patent No.: US 9,718,238 B2
(45) Date of Patent: Aug. 1, 2017

(54) SYSTEM AND METHOD FOR DEPOSITING LIQUIDS

(71) Applicant: Stratasys Ltd., Rechovot (IL)

(72) Inventors: Avraham Teken, Gan-Yavne (IL); Moshe Aknin, ModiIn (IL); Gregory Brusilovski, Kfar-Saba (IL)

(73) Assignee: Stratasys Ltd., Rehovot (IL)

( * ) Notice: Subject to any disclaimer, the term of this patent is extended or adjusted under 35 U.S.C. 154(b) by 0 days.

(21) Appl. No.: 14/382,554

(22) PCT Filed: Mar. 4, 2013

(86) PCT No.: PCT/IL2013/050194
§ 371 (c)(1),
(2) Date: Sep. 3, 2014

(87) PCT Pub. No.: WO2013/132484
PCT Pub. Date: Sep. 12, 2013

(65) Prior Publication Data
US 2015/0035186 A1    Feb. 5, 2015

Related U.S. Application Data

(60) Provisional application No. 61/606,417, filed on Mar. 4, 2012.

(51) Int. Cl.
*B29C 67/00* (2017.01)
*B41J 2/14* (2006.01)
*B29K 105/00* (2006.01)

(52) U.S. Cl.
CPC ...... *B29C 67/0055* (2013.01); *B29C 67/0088* (2013.01); *B41J 2/14145* (2013.01);
(Continued)

(58) Field of Classification Search
CPC ............ B29C 67/0055; B29C 67/0088; B29C 67/0085; B29C 67/0051; B29C 67/0059;
(Continued)

(56) References Cited

U.S. PATENT DOCUMENTS 3,919,370 A * 11/1975 Cotterell ............. B29C 44/0469
                                                                    209/498
5,113,199 A * 5/1992 Chan ..................... B41J 2/175
                                                                    347/87

(Continued)

FOREIGN PATENT DOCUMENTS

CN    101138789     3/2008
CN    101898423    12/2010
(Continued)

OTHER PUBLICATIONS

International Search Report and the Written Opinion Dated Jun. 20, 2013 From the International Searching Authority Re. Application No. PCT/IL2013/050194.
(Continued)

*Primary Examiner* — Alison L Hindenlang
*Assistant Examiner* — Jerzi H Moreno Hernandez

(57) ABSTRACT

A printing head for a printing system is disclosed. The printing head comprises a plurality of compartments, each having an outlet port for depositing liquid and an inlet port separately connectable to a separate liquid container. At least two compartments are in controllable fluid communication with each other, and the printing head comprises an arrangement of sensors configured for generating signals indicative of (i) a filling state of each compartment, and (ii) a fluid communication state between the at least two compartments.

29 Claims, 9 Drawing Sheets

(52) U.S. Cl.
CPC ....... *B41J 2/14153* (2013.01); *B41J 2/14201* (2013.01); *B29K 2105/0058* (2013.01); *B41J 2002/14419* (2013.01)

(58) Field of Classification Search
CPC  B41J 2/14201; B41J 2/14153; B41J 2/14145; B41J 2002/14419; B29K 2105/0058; B33Y 30/00
See application file for complete search history.

(56) References Cited

U.S. PATENT DOCUMENTS

| | | | |
|---|---|---|---|
| 7,500,846 | B2 | 3/2009 | Eshed et al. |
| 7,604,768 | B2 * | 10/2009 | Kritchman .............. B29C 41/02 264/308 |
| 8,038,427 | B2 | 10/2011 | Kritchman et al. |
| 2001/0045678 | A1 * | 11/2001 | Kubo ...................... B29C 41/36 264/37.29 |
| 2002/0027306 | A1 * | 3/2002 | Sulzbach ................ B01F 7/008 264/102 |
| 2002/0096112 | A1 * | 7/2002 | Coe ..................... B29C 67/0059 118/663 |
| 2005/0012247 | A1 * | 1/2005 | Kramer ............... B29C 67/0059 264/401 |
| 2006/0127153 | A1 * | 6/2006 | Menchik et al. ................ 400/62 |
| 2007/0080981 | A1 * | 4/2007 | Karppinen ........... B41J 2/16526 347/22 |
| 2007/0097175 | A1 * | 5/2007 | Stelter et al. ................... 347/43 |
| 2010/0007692 | A1 * | 1/2010 | Vanmaele ........... B29C 67/0055 347/21 |
| 2010/0140850 | A1 | 6/2010 | Napadensky et al. |
| 2010/0191360 | A1 | 7/2010 | Napadensky et al. |
| 2011/0060445 | A1 | 3/2011 | Heenan |
| 2011/0109695 | A1 * | 5/2011 | Murray ...................... B41J 2/14 347/44 |
| 2011/0242237 | A1 | 10/2011 | Uezawa |

FOREIGN PATENT DOCUMENTS

| | | | |
|---|---|---|---|
| JP | 11138839 A | * 5/1999 | .............. B41J 2/175 |
| JP | 2001-047520 | 2/2001 | |
| JP | 2002-307562 | 10/2002 | |
| JP | 2004-255839 | 9/2004 | |
| JP | 2010-076414 | 4/2010 | |
| JP | 2011-005658 | 1/2011 | |
| WO | WO 2011/136774 | 11/2011 | |
| WO | WO 2013/132484 | 9/2013 | |

OTHER PUBLICATIONS

International Preliminary Report on Patentability Dated Sep. 18, 2014 From the International Bureau of WIPO Re. Application No. PCT/IL2013/050194.
Notification of Office Action and Search Report Dated Jul. 9, 2015 From the State Intellectual Property Office of the People's Republic of China Re. Application No. 201380019977.1 and Translation of Office Action in English.
Notice of Reason for Rejection Dated Jan. 4, 2017 From the Japan Patent Office Re. Application No. 2014-560521. (4 Pages).
Translation of Notice of Reason for Rejection Dated Jan. 4, 2017 From the Japan Patent Office Re. Application No. 2014-560521. (5 Pages).

* cited by examiner

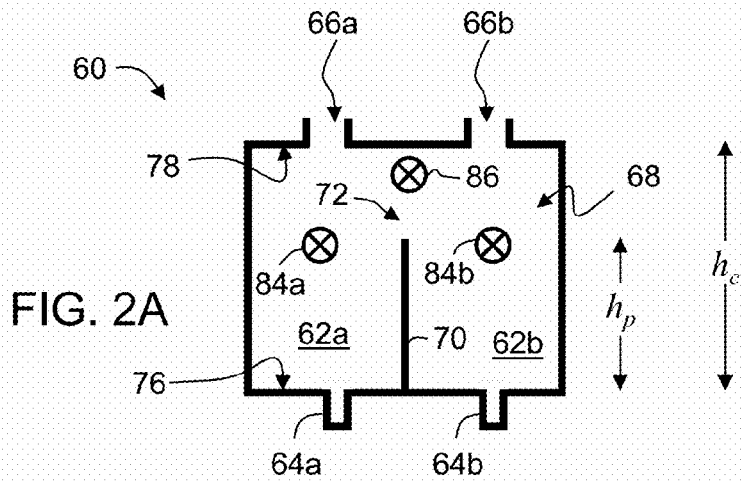
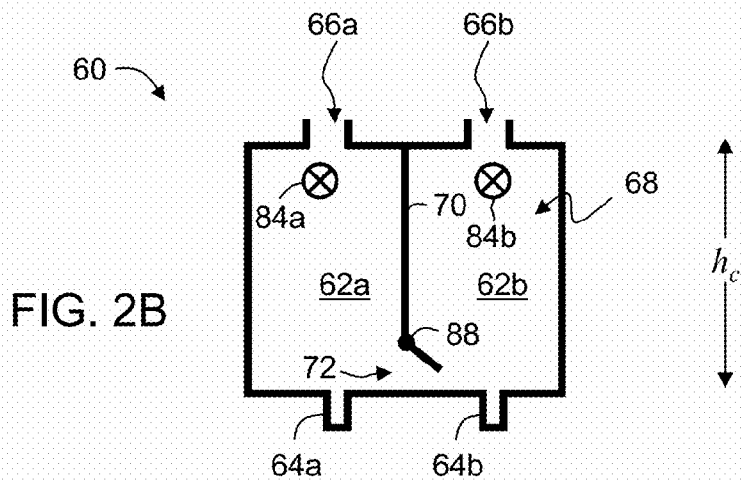
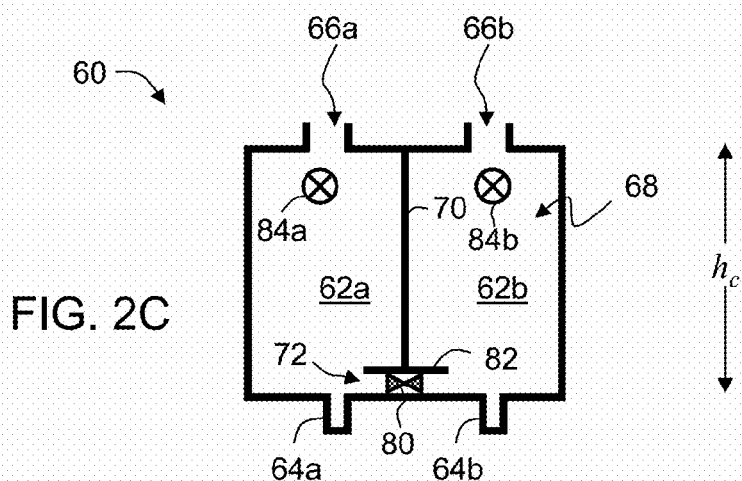

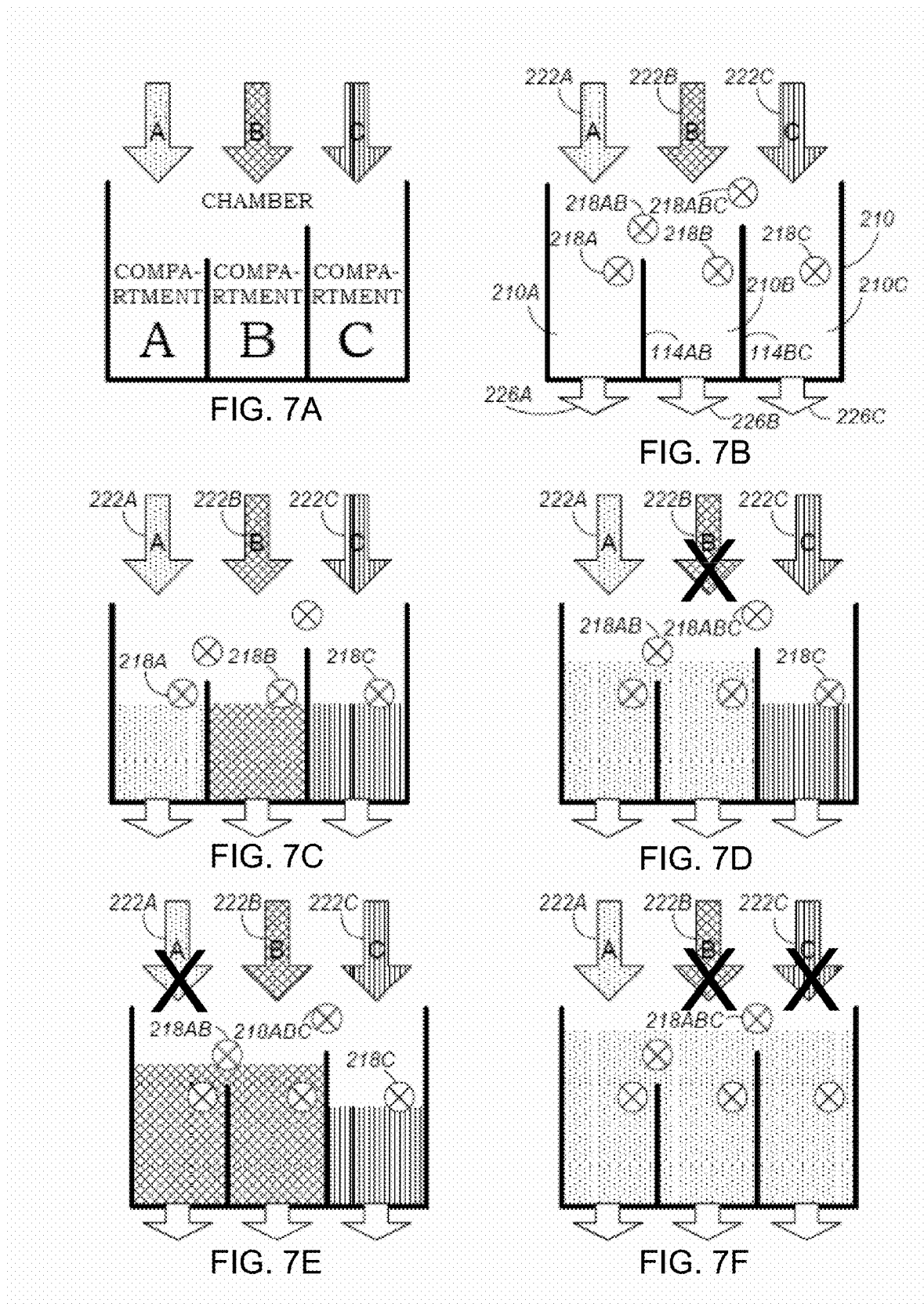

SYSTEM AND METHOD FOR DEPOSITING LIQUIDS

RELATED APPLICATIONS

This application is a National Phase of PCT Patent Application No. PCT/IL2013/050194 having International filing date of Mar. 4, 2013, which claims the benefit of priority under 35 USC §119(e) of U.S. Provisional Patent Application No. 61/606,417 filed on Mar. 4, 2012. The contents of the above applications are all incorporated by reference as if fully set forth herein in their entirety.

FIELD AND BACKGROUND OF THE INVENTION

The present invention, in some embodiments thereof, relates to deposition of liquids and, more particularly, but not exclusively, to deposition of liquids by a printing system, e.g., a three-dimensional printing system.

Additive manufacturing is generally a process in which a three-dimensional (3D) object is manufactured utilizing a computer model of the objects. Such a process is used in various fields, such as design related fields for purposes of visualization, demonstration and mechanical prototyping, as well as for rapid manufacturing.

The basic operation of any additive manufacturing system consists of slicing a three-dimensional computer model into thin cross sections, translating the result into two-dimensional position data and feeding the data to control equipment which manufacture a three-dimensional structure in a layerwise manner.

Additive manufacturing entails many different approaches to the method of fabrication, including three-dimensional printing, laminated object manufacturing, fused deposition modeling and others.

In three-dimensional printing processes, for example, a building material is dispensed from a printing head having a set of nozzles to form layers of deposited material on a supporting structure. Depending on the building material, the layers may then be cured or solidified using a suitable device. The building material may include modeling material, which forms the object, and support material, which supports the object as it is being built. Various three-dimensional printing techniques exist and are disclosed in, e.g., U.S. Pat. Nos. 6,259,962, 6,569,373, 6,658,314, 6,850,334, 7,183,335 7,209,797, 7,225,045, 7,300,619, 7,479,510, 7,500,846, 7,658,976, and 7,962,237, all of the same Assignee, the contents of which are hereby incorporated by reference.

Some three-dimensional printing systems include two inkjet heads, where one inkjet deposits the modeling material and another inkjet head deposits the support material. More sophisticated printing systems are capable of printing objects made of two or more modeling materials. These systems include two or more heads for depositing different materials, allowing the designer to control the mechanical, thermal and/or aesthetic properties of various regions of the printed object. Such type of three-dimensional printing system is disclosed in U.S. Published Applications No. 20100191360, the contents of which are hereby incorporated by reference.

SUMMARY OF THE INVENTION

According to an aspect of some embodiments of the present invention there is provided a printing head for a printing system. The printing head comprises a plurality of compartments, each having an outlet port for depositing liquid and an inlet port separately connectable to a separate liquid container. According to various exemplary embodiments of the present invention at least two compartments are in controllable fluid communication with each other, and the printing head comprises an arrangement of sensors configured for generating signals indicative of (i) a filling state of each compartment, and (ii) a fluid communication state between the at least two compartments.

According to some embodiments of the invention the compartments occupy a chamber and are separated by at least a partition, wherein the fluid communication is via a liquid passage in the chamber.

According to some embodiments of the invention the liquid passage is between an upper end of the partition and an upper wall of the chamber.

According to some embodiments of the invention the partition is movable to form the liquid passage.

According to some embodiments of the invention the liquid passage comprises a controllable inter-compartment valve.

According to some embodiments of the invention the arrangement of sensors comprises at least a first sensor in a first compartment of the at least two compartments, a second sensor in a second compartment of the at least two compartments, and a third sensor in the liquid passage.

According to some embodiments of the invention the plurality of compartments comprises only two compartments.

According to some embodiments of the invention the plurality of compartments comprises at least three compartments.

According to some embodiments of the invention the controllable fluid communication comprises at least a first fluid communication between a first pair of compartments, and a second fluid communication between a second pair of compartments, and wherein at least the first fluid communication is controllable independently from the second fluid communication.

According to some embodiments of the invention the at least three compartments are arranged serially, wherein each the controllable fluid communication is between every two adjacent compartments.

According to some embodiments of the invention the at least three compartments are arranged serially in a chamber and are separated by a plurality of partitions, and wherein at least two of the partitions are of different heights.

According to some embodiments of the invention the plurality of compartments comprises at least four compartments.

According to an aspect of some embodiments of the present invention there is provided a printing system. The printing system comprises a printing head as delineated hereinabove and optionally as further detailed hereinunder. The printing system further comprises a plurality of separate liquid containers each being separately connected to a respective compartment by a conduit having a controllable valve therein, and a controller configured for controlling each valve of each conduit responsively to the signals from the sensors.

According to some embodiments of the invention the printing system comprises a computer for operating the controller according to a printing mode selected from the group consisting of at least: a first printing mode, in which at least two compartments are filled with liquids from different containers; a second printing mode, in which at least two compartments are filled with liquid from the same container; and a third printing mode in which at least one compartment is filled with liquid from one container and at least one compartment remains generally empty.

According to some embodiments of the invention, in at least the first printing mode, the controller signals the valves so as to simultaneously feed at least two of the compartments with liquids from different containers.

According to some embodiments of the invention, in at least the first printing mode, the controller signals the valves so as to sequentially feed at least two of the compartments with liquids from different containers.

According to some embodiments of the invention the computer is configured to obtain a ratio between at least two different liquids respectively contained in at least two separate containers, to calculate a deposition duty cycle of the at least two different liquids corresponding to the ratio, and to operate the controller to feed at least two of the compartments with the two liquids according to the calculated deposition duty cycle.

According to some embodiments of the invention the printing system is a three-dimensional printing system wherein at least two liquid containers contain different modeling materials.

According to some embodiments of the invention at least one of the liquid containers contains a support material.

According to some embodiments of the invention at least two of the liquid containers contain different support materials.

According to some embodiments of the invention the printing system comprises a separate printing head connected to a liquid container containing a support material.

According to an aspect of some embodiments of the present invention there is provided a method of printing. The method comprises receiving printing data and operating a printing system responsively to the printing data. The printing system can be the system as system as delineated above and optionally as further detailed hereinunder.

According to an aspect of some embodiments of the present invention there is provided a method of printing a three-dimensional object. The method comprises: receiving a shape of the three-dimensional object, and operating a printing system to form a plurality of layers in a configured pattern corresponding to the shape. The printing system can be the system as system as delineated above and optionally as further detailed hereinunder.

According to an aspect of some embodiments of the present invention there is provided a method of printing. The method comprises feeding at least one printing material into a printing head having a plurality of compartments each having an outlet port while controlling fluid communication among at least two of the compartments.

The method further comprises using the outlet ports for depositing the printing material(s) onto a receiving surface.

According to some embodiments of the invention the method feeds at least two compartments with different printing materials.

According to some embodiments of the invention the method controls the fluid communication by establishing flow of printing material between at least two compartments such as to fill the at least two compartments with the same printing material.

According to some embodiments of the invention the method feeds at least two compartments with different printing materials.

According to some embodiments of the invention the method prevents flow of printing material into at least one compartment, such that the respective compartment remains generally empty while at least one other compartment is filled with the printing material.

According to some embodiments of the invention the printing material(s) comprises at least one modeling material and at least one support material, wherein the depositing is executed to form a plurality of layers in a configured pattern corresponding to a shape of a three-dimensional object.

According to some embodiments of the invention the modeling material(s) comprises at least two modeling materials, wherein the method feeds at least two compartments with different modeling materials.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions.

Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 2A-C are schematic illustrations of a printing head according to some embodiments of the present invention;

FIGS. 7A-F are schematic illustrations describing the operation of a printing head having three compartments, according to some embodiments of the present invention.

DESCRIPTION OF SPECIFIC EMBODIMENTS OF THE INVENTION

Figure 1:
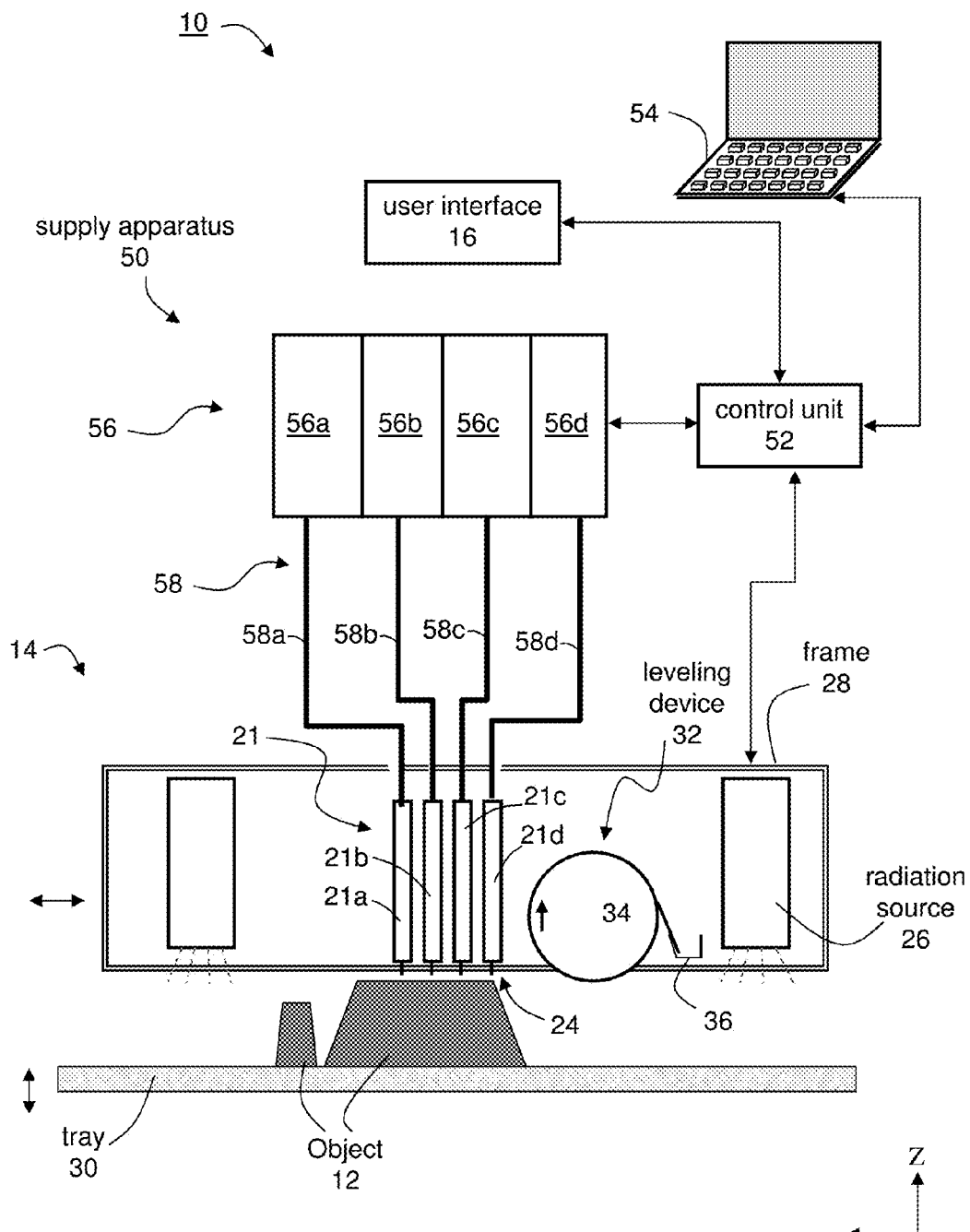
FIG. 1 is a schematic illustration of a three-dimensional printing system having a plurality of printing heads.

The present invention, in some embodiments thereof, relates to deposition of liquids and, more particularly, but not exclusively, to deposition of liquids by a printing system, e.g., a three-dimensional printing system.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments can be utilized for printing. In some embodiments of the present invention the method and system manufacture three-dimensional objects in a layerwise manner by forming a plurality of layers in a configured pattern corresponding to the shape of the objects.

While the embodiments below are described with a particular emphasis on three-dimensional printing, it is to be understood that more detailed reference to three-dimensional printing is not to be interpreted as limiting the scope of the invention in any way.

The printing can be performed by one or more printing heads controlled by a controller. The printing head scans a two-dimensional surface and patterns it. While scanning, the printing head visits a plurality of target locations on the two-dimensional layer or surface, and a controller decides, for each target location or a group of target locations, whether or not the target location or group of target locations is to be occupied by printing material, and which type of printing material is to be delivered thereto. The decision is made according to a computer image of the surface. The printing head deposits printing material in target locations which are to be occupied and leaves other target locations void.

In three-dimensional printing, the printing material is referred to in the literature as "building material" and it is deposited in layers on a supporting structure.

The types of building materials can be categorized into two major categories: modeling material and support material. The support material serves to provide a supporting matrix or construction for supporting the object or object parts during the fabrication process and/or other purposes, e.g., providing hollow or porous objects.

Support constructions may additionally include modeling material elements, e.g., for further support strength or reinforcement.

The modeling material is generally a composition which is formulated for use in Additive manufacturing and which is able to form a three-dimensional object on its own, i.e., without having to be mixed or combined with any other substance.

The final three-dimensional object is made of the modeling material or a combination of modeling and support material or modification thereof (e.g., following curing). All these operations are well-known to those skilled in the art of solid freeform fabrication.

In some exemplary embodiments of the invention an object is manufactured by depositing two or more different modeling materials. The materials are optionally and preferably deposited in layers during the same pass of the printing head. The materials and combination of materials within the layer are selected according to the desired properties of the object.

The term "object" as used herein refers to a whole object or a part thereof.

For purposes of better understanding some embodiments of the present invention, as illustrated in FIGS. 2-8 of the drawings, reference is first made to the construction and operation of a three-dimensional printing system 10 as illustrated in FIG. 1.

System 10 comprises a three-dimensional printing apparatus 14 having a printing unit 21 which comprises a plurality of printing heads. Each head preferably comprises an array of one or more nozzles (not shown), through which a liquid building material 24 is deposited.

Each printing head is fed via a building material reservoir which may optionally include a temperature control unit (e.g., a temperature sensor and/or a heating device), and a material level sensor. To deposit the building material, a voltage signal is applied to the printing heads to selectively deposit droplets of material via the printing head nozzles, for example, as in piezoelectric inkjet printing technology. The printing rate of each head depends on the number of nozzles, the type of nozzles and the applied voltage signal rate (frequency). Such printing heads are known to those skilled in the art of solid freeform fabrication.

In the example of FIG. 1, four printing heads 21a, 21b, 21c and 21d are illustrated. Each of heads 21a, 21b, 21c and 21d has a nozzle array. Heads 21a and 21b can be designated for modeling material(s) and heads 21c and 21d can be designated for support material. Thus, head 21a can deposit a first modeling material, head 21b can deposit a second modeling material and heads 21c and 21d can both deposit support material. Alternatively, heads 21c and 21d can be combined in a single head having more nozzles than each of heads 21a and 21b.

Apparatus 14 can further comprise a curing unit which can comprise one or more radiation sources 26, which can be, for example, an ultraviolet or visible or infrared lamp, or other sources of electromagnetic radiation, or electron beam source, depending on the modeling material being used. Radiation source 26 serves for curing or solidifying the modeling material.

The printing head or heads and radiation source or sources can be mounted in a frame or block 28 which is preferably operative to reciprocally move over a tray 30, which serves as the working surface. The radiation sources can be mounted in the block such that they follow in the wake of the printing heads to at least partially cure or solidify the materials just deposited by the printing heads. According to the common conventions, tray 30 is positioned in the X-Y plane. Tray 30 is typically configured to move vertically (along the Z direction), e.g., downward. Apparatus 14 can further comprise one or more leveling devices 32, e.g., a roller 34. Leveling device 32 serves to straighten, level and/or establish a thickness of the newly formed layer prior to the formation of the successive layer thereon. Leveling device 32 can comprise a waste collection device 36 for collecting the excess material generated during leveling. Waste collection device 36 may comprise any mechanism that delivers the material to a waste tank or waste cartridge.

In use, the printing heads of unit 21 move in a scanning direction, which is referred to herein as the X direction, and selectively deposit building material in a predetermined configuration in the course of their passage over tray 30. The building material typically comprises one or more types of modeling material and one or more types of support material. The passage of the printing heads of unit 21 is followed by the curing of the deposited material(s) by radiation source 26. In the reverse passage of the heads, back to their starting point for the layer just deposited, an additional deposition of building material(s) may be carried out, according to a predetermined configuration. In the forward and/or reverse passages of the printing heads, the layer thus formed may be straightened by leveling device 32, which can follow in the path of the printing heads in their forward and/or reverse movement. Once the printing heads return to their starting point along the X direction, they may move to another position along an indexing direction, referred to herein as the Y direction, and continue to build the same layer by reciprocal movement along the X direction. Alternately, the printing heads may move in the Y direction between forward and reverse movements or after more than one forward-reverse movement. The series of scans performed by the printing heads to complete a single layer is referred to herein as a single scan cycle.

Once the layer is completed, tray 30 is lowered in the Z direction to a predetermined Z level, according to the desired thickness of the layer subsequently to be printed. The procedure is repeated to form three-dimensional object 12 in a layerwise manner.

Tray 30 can alternatively or additionally be displaced in the Z direction between forward and reverse passages of the printing head of unit 21, within the layer. Such Z displacement may be carried out for example in order to cause contact of the leveling device with the surface in one direction and prevent contact in the other direction.

System 10 also comprises a building material supply apparatus 50 which comprises the building material containers or cartridges and supplies a plurality of building materials to fabrication apparatus 14, via a respective plurality of supply ducts 58. In the illustration of FIG. 1, four supply containers 56a, 56b, 56c and 56d, and four supply ducts 58a, 58b, 58c and 58d are shown, for providing building materials to heads 21a, 21b, 21c and 21d, respectively.

A control unit 52 controls fabrication apparatus 14 and supply apparatus 50.

Control unit 52 can communicate with a computer or data processor 54 which transmits digital data pertaining to fabrication instructions based on computer object data, e.g., a CAD configuration represented on a computer readable medium in a form of a Standard Tessellation Language (STL) format or the like. Typically, control unit 52 controls the voltage applied to each printing head or nozzle array and the temperature of the building material in the respective printing head.

Once the manufacturing data is loaded to control unit 52 it can operate without user intervention. Control unit 52 may, however, receive additional input from the operator, e.g., using data processor 54 or using a user interface 16 communicating with unit 52. User interface 16 can be of any type known in the art, such as, but not limited to, a keyboard, a touch screen and the like. For example, control unit 52 can receive, as additional input, one or more building material types and/or attributes, such as, but not limited to, color, characteristic distortion and/or transition temperature, viscosity, electrical property, magnetic property. Other attributes and groups of attributes are also contemplated.

System 10 can fabricate an object by depositing different materials from different printing heads. This provides the ability to select materials from a given number of materials and define desired combinations of the selected materials and their properties.

The spatial locations of the deposition of each material with the layer are defined, either to effect occupation of different three-dimensional spatial locations by different materials, or to effect occupation of substantially the same three-dimensional location or adjacent three-dimensional locations by two or more different materials so as to allow post-deposition spatial combination of the materials within the layer, thereby to form a composite material at the respective location or locations.

Any post-deposition combination or mix of modeling materials is contemplated.

For example, once a certain material is deposited it may preserve its original properties. However, when it is deposited simultaneously with another modeling material or other deposited materials which are deposited at the same or nearby locations, a composite material having a different property or properties to the deposited materials may be formed.

System 10 thus provides the ability to deposit a broad range of material combinations, and the fabrication of an object which may consist of multiple different combinations of materials, in different parts of the object, according to the properties desired to characterize each part of the object.

Further details on the principles and operations of a three-dimensional printing system such as system 10 is found in U.S. Published Application No. 20100191360, the contents of which are hereby incorporated by reference.

While system 10 is designed for printing objects from several printing materials, the user may decide to print an object using a smaller number of materials. For example, it may be desired to print an object using only one modeling material. In such a case, for faster printing, multiple heads may be used for printing the same material, thereby providing a high-speed printing mode.

When it is desired to use a printing head for printing a material which is different to the material which was previously deposited by the same printing head, it is oftentimes required to flush the printing head and the respective supply duct until the previously deposited material is removed and/or completely replaced. It was found by the present inventors that this operation results in a substantial amount of waste. The problem is aggravated when multiple heads are all used for depositing the same material, since in such scenario the amount of waste grows linearly with the number of heads which need to be flushed.

The discovered problem creates a conflict between the advantage of high-speed printing and the disadvantage of increasing the amount of waste.

In a search for a solution to the problem, the present inventors devised a printing head which provides a high-speed printing mode while maintaining low amount of waste.

Reference is now made to FIGS. 2A-C which are schematic illustrations of a printing head 60 according to some embodiments of the present invention. Printing head 60 can be employed in a printing system, such as, but not limited to, a three-dimensional printing system as further detailed hereinbelow.

Printing head 60 can comprise a plurality of compartments 62, each having an outlet port 64 for depositing liquid (preferably, but not necessarily printing material in liquid form) and an inlet port 66. Two compartments 62a and 62b are illustrated in FIGS. 2A-C, with respective two inlet ports 66a and 66b and respective two outlet ports 64a and 64b, but more than two compartments are not excluded from the scope of the present invention. Configurations with three and four compartments are described hereinunder. Compartments 62 optionally and preferably occupy a chamber 68 and are separated by at least a partition 70.

In various exemplary embodiments of the invention each inlet port of each compartment is separately connectable to a separate liquid container (not shown, see FIGS. 3-5), and at least two of the compartments are in controllable fluid communication with each other.

The fluid communication is "controllable" in the sense that an operation or lack thereof outside printing head 60 can establish or disestablish the fluid communication between the respective two compartments.

The present embodiments contemplate more than one configuration that controls the fluid communication. Three representative configurations suitable for some embodiments of the present invention are illustrated in FIGS. 2A-C described below, but other configurations are not excluded from the scope of the present invention.

FIG. 2A schematically illustrates a configuration in which there is a liquid passage 72 in the form of a gap between the upper end of partition 70 and an upper wall 78 of chamber 68. In this embodiment, the height $h_p$ of partition 70 is shorter than a height $h_c$ of chamber 68 and it is positioned on the bottom 76 of chamber 68. Fluid communication can be establish or disestablish by controlling the level of liquid in chamber 68. Specifically, when the level of the liquid is below $h_p$, there is no fluid communication between the compartments, and when the level of the liquid is above $h_p$ fluid communication is established between the compartments.

FIG. 2B illustrates a configuration in which partition 70 or part thereof is movable or resizable to form liquid passage 72, and fluid communication is established and disestablish by controlling the state of partition 70. In the illustrated embodiment, the lower part of partition 70 is rotated so that liquid passage 72 is formed in the gap between the lower end of partition 70 and the bottom 76 of chamber 68. Other configurations for movable or resizable partitions partition are not excluded from the scope of the present invention.

FIG. 2C illustrates a configuration in which liquid passage 72 comprises a controllable inter-compartment valve 80, having at least an open state and a closed state.

In this embodiment, liquid passage 72 can be in the form of a conduit 82 interconnecting the two compartments (compartments 62a and 62b in the present example), wherein inter-compartment valve 80 is fittedly positioned in conduit 82. In these embodiments, fluid communication is established and disestablish by controlling the state (open/closed) of valve 80.

When the printing head comprises more than two compartments, there are optionally and preferably two or more controllable fluid communications. For example, the printing head can feature a first fluid communication among a first pair of compartments, and a second fluid communication among a second pair of compartments. In these embodiments, at least the first fluid communication is controllable independently from the second fluid communication.

When the fluid communication is established by moving or resizing partition 70 (FIG. 2B) or via inter-compartment valve 80 (FIG. 2C), the independent control over the fluid communication can be achieved by independently controlling the partitions or valves between each pair of compartments.

When the fluid communication is established by controlling the liquid level in chamber 68 (FIG. 2A) the independent control over the fluid communication can be achieved by separating different pairs of compartments using partitions of different heights. A representative example of such independent control is provided in the Examples section that follows.

The advantage of connecting the compartments to separate liquid containers, while maintaining the ability to establish fluid communication among the compartments, is that it significantly reduces the amount of waste when the same material is deposited from two different compartments. In conventional systems such as system 10 above, two printing heads can deposit the same material only when the respective supply containers and the respective supply ducts are filled with the same material, since there is no fluid communication among the heads. In printing head 60, the same supply container and the same supply duct can be used for feeding two compartments. For example, printing head 60 can have a printing mode in which fluid communication is established between compartments 62a and 62b, so that a particular supply container (not shown, see FIGS. 3-5) that is connected, e.g., to inlet port 66a can feed both compartments 62a and 62b. In this printing mode, there is optionally and preferably no supply of liquid via inlet port 66b. A more detailed description of this and other printing modes is provided in the Examples section that follows (see Examples 2-4).

Another advantage of connecting the compartments to separate liquid containers while maintaining the ability to establish fluid communication among the compartments, is that it allows intra-head mixing between different materials. For example, printing head 60 can have a printing mode in which fluid communication is established between compartments 62a and 62b, while maintaining supply of a first material via inlet port 66a into compartment 62a and a second material via inlet port 66b into compartment 62b. The first and second materials are preferably different from each other and are supplied by two separated supply containers respectively connected to ports 66a and 66b. Since in this printing mode there is fluid communication between compartments 62a and 62b, the materials in compartments 62a and 62b are allowed to mix within printing head 60 to provide a building material mixture that can then be deposited out of printing head 60, preferably immediately after mixing. This printing mode is particularly useful when it is desired to deposited a mixture of individual materials wherein the shelf life of at least one of the individual materials is relatively long but the shelf life of the mixture is relatively short (shorter than the shelf life of at least one of the individual materials). A representative example is the addition of an additive (e.g., a colorant, a curing agent such as an initiator, a conductivity control agent, a charge control agent, a magnetic additive, etc.) with a short shelf life to a modeling material, wherein the lifetime of the mix is, as a result, shorter than the shelf life of the modeling material.

In various exemplary embodiments of the invention printing head 60 comprises an arrangement of sensors configured for generating signals indicative of both the filling state of each compartment, and the fluid communication state among the compartments.

As used herein "filling state" refers to the information that indicates at least whether or not the compartment contains liquid. In some embodiments of the present invention "filling state" refers to the information that indicates whether or not the compartment is completely filled with liquid, and in some embodiments of the present invention "filling state" refers to information pertaining to the amount of liquid in the compartment.

As used herein "fluid communication state" refers to the information that indicates at least whether or not there is a flow of liquid between two compartments. In some embodiments of the present invention "fluid communication state" refers to information pertaining to the amount or rate of liquid flow between the compartments.

The sensors can be realized in more than one way. Typically liquid-level sensors are used for providing the information pertaining to the filling state of the compartments.

Thus, a liquid-level sensor is optionally and preferably positioned at least at the top part of each individual compartment so as to generate a signal when the liquid level in the compartment reaches the top part of the compartment. The liquid-level sensors that sense the liquid levels in compartments 62a and 62b are shown at 84a and 84b, respectively.

In configurations in which the liquid passage 72 between the compartments is at the upper part of chamber 68 (e.g., the configuration illustrated in FIG. 2A), a liquid-level sensor 86 can optionally and preferably also be used for generating signals indicative of the fluid communication state among the compartments. In this embodiment, sensor 86 is positioned in liquid passage 72 at a vertical position which is more than $h_p$ above the bottom 76 of chamber 68, so as to generate a signal when the liquid level in chamber 68 exceeds $h_p$. Such signal is indicative of fluid communication since when the liquid level is higher than exceeds $h_p$ the liquid overflows partition 70 from one compartment to the other.

When the fluid communication among the compartments is controlled by a movable or resizable partition (FIG. 2B), a sensor 88 can be mounted on partition 70 for providing indication regarding the state of the partition. For example, sensor 88 can be a position sensor or an accelerometer or that generates a signal when partition 70 or part thereof is displaced, rotated or resized, or part thereof is rotatable. When the fluid communication among the compartments is controlled by an inter-compartment valve, the inter-compartment valve can also enact the function of a sensor, indicating the state (open/close) of the valve.

Printing head 60 can be utilized in a printing process which includes feeding one or more printing materials into printing head 60, while controlling the fluid communication among two or more of the compartments, and using outlet ports for depositing the printing material(s) onto a receiving surface.

Figure 3:
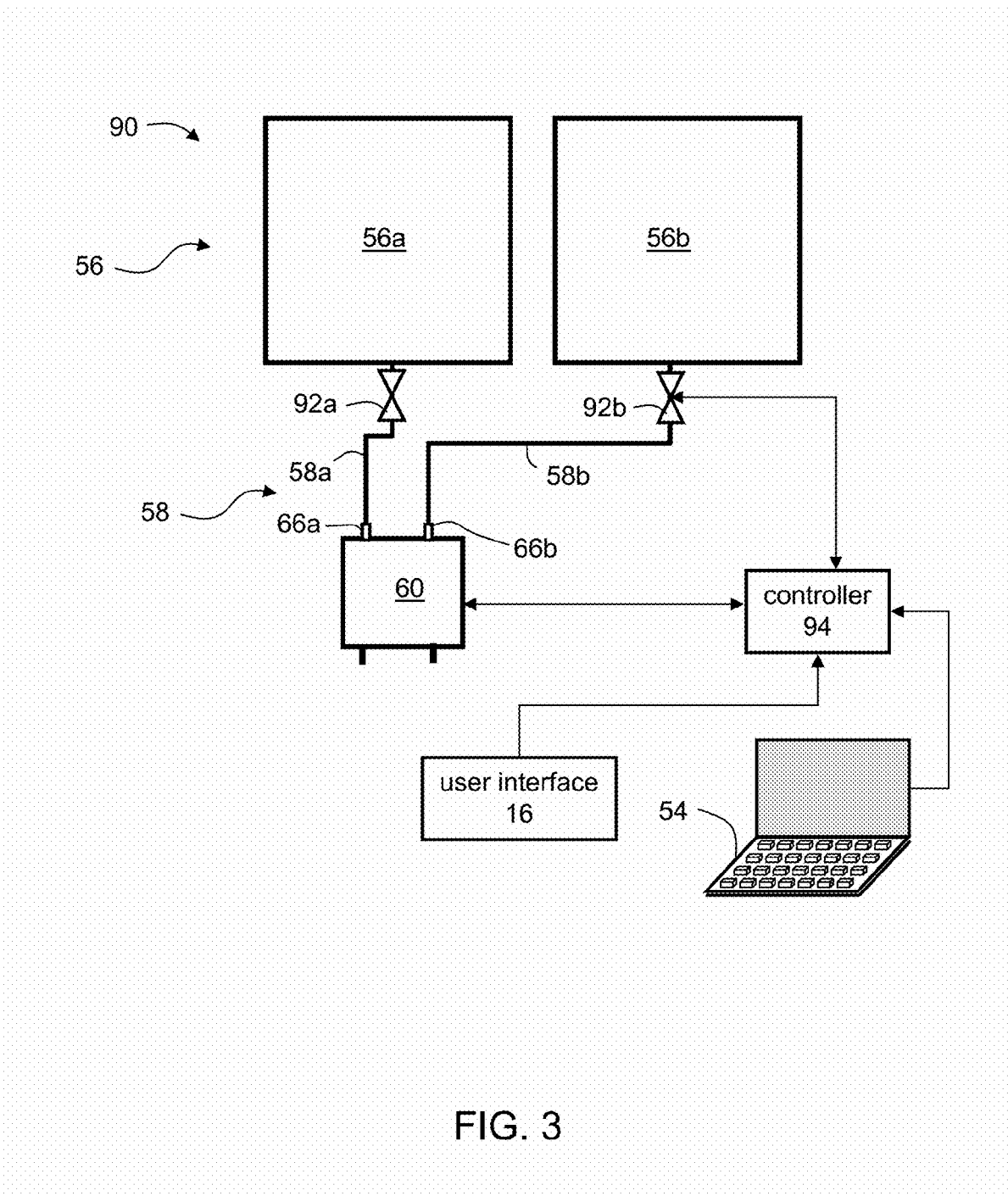
FIG. 3 is a schematic illustration of a printing system incorporating the printing head of FIGS. 2A-C, according to some embodiments of the present invention.

Reference is now made to FIG. 3 which is a schematic illustration of a printing system 90, according to some embodiments of the present invention. System 90 can be a two-dimensional or a three-dimensional printing system. A more detailed illustration of system 90 in the embodiments in which system 90 is a three-dimensional printing system is provided in FIGS. 4A-B.

System 90 typically comprises printing head 60 as further detailed hereinabove, and a plurality of separate liquid containers 56 each being separately connected to a respective compartment (not specifically shown, see FIGS. 2A-C) of printing head 60 by a supply conduit 58. In the schematic illustration of FIG. 3 two separate liquid containers 56a and 56b and two respective conduits 58a and 58b are shown. Conduits 58a and 58b are connected to the compartments via inlet ports 66a and 66b. Each of the conduits has a controllable valve 92 having an open state at which the liquid flows within the respective conduit, and a closed state at which liquid flow is prevented. The valves of conduits 58a and 58b are designated 92a and 92b, respectively.

Figure 4A:
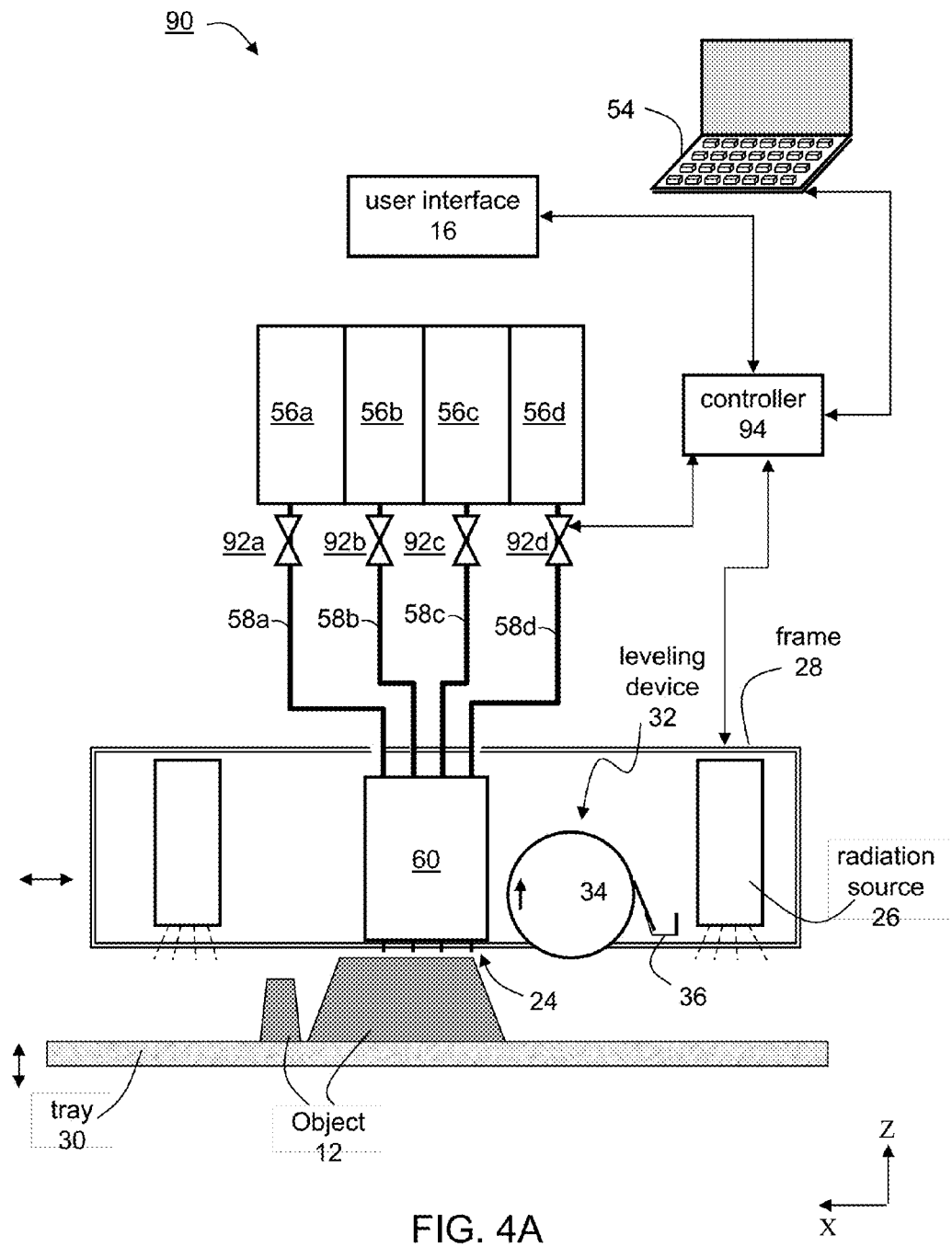
FIGS. 4A-B are schematic illustrations of a three-dimensional printing system incorporating printing heads of some embodiments of the present invention.

In the schematic illustration of FIG. 4A, four separate containers 56a, 56b, 56c and 56d are shown. The respective conduits are designated 58a, 58b, 58c and 58d, and the respective valves are designated 92a, 92b, 92c and 92d. Conduits 58a-d are connected to four compartments in printing head 60 via respective inlet ports (the compartments and ports are not specifically shown). One or more of container 56a-d optionally and preferably contains support material and the other containers contain modeling material.

Figure 4B:
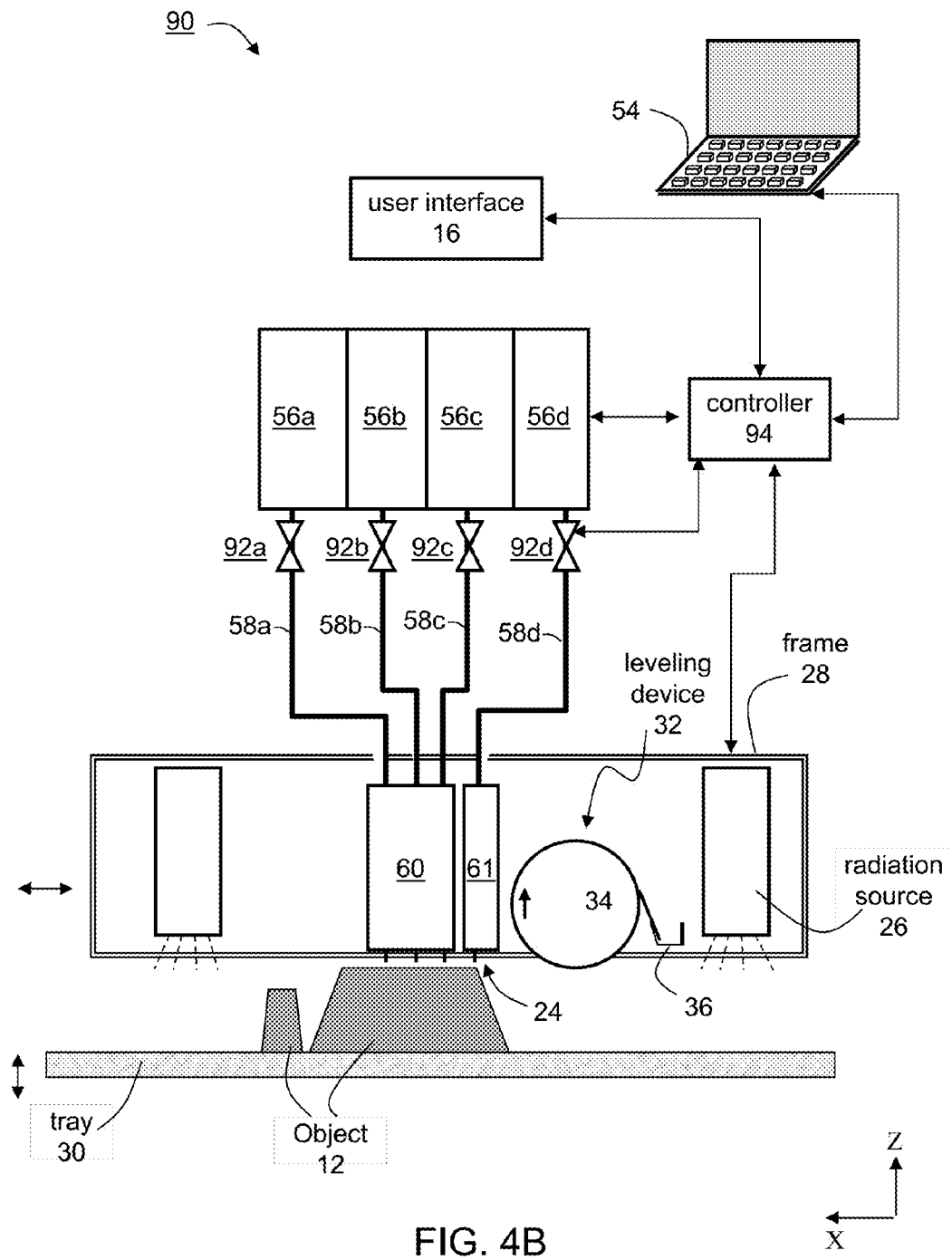

The schematic illustration of FIG. 4B, is generally the same as in FIG. 4A except that in addition to printing head 60 there is an additional and separate printing head 61.

The principles and operations of head 61 can be the same as those of head 60.

Alternatively head 61 can be a conventional single-chamber printing head as known in the art. One or more of the supply containers can be connected to head 60 and the other containers can be connected to head 61. For example, containers 56a-c can be connected to head 60 and container 56d can be connected to head 61. Typically, but not necessarily, containers that are connected to head 60 contain modeling material and containers that are connected to head 61 contain support material.

It is to be understood that the drawings in FIGS. 3, 4A and 4B are for illustrative purpose and that system 90 can comprise any number of supply containers, supply ducts and compartments.

System 90 optionally and preferably comprises a controller 94 which receives signals from the sensors of printing head 60 (not shown in FIG. 3, see FIGS. 2A-C), and controls each of valves 92 responsively to the received signals. In embodiments in which fluid communication between compartments is established or disestablished by moving or resizing the partition (see FIG. 2B) or by an inter-compartment valve (see FIG. 2C), controller 94 preferably controls the partition or inter-compartment valve.

In various exemplary embodiments of the invention system 90 comprises a data processor or computer 54 configured for operating controller 94 according to a printing mode of system 90. The present embodiments contemplate several printing modes.

In a first printing mode, at least two of the compartments are filled with liquids from different containers. This mode can be implemented by allowing the two compartments to be fed via their inlet ports and preventing fluid communication among these compartments.

In a second printing mode, at least two of the compartments are filled with liquid from the same container. This mode can be implemented by allowing only one of the two compartments to be fed via its inlet port, and establishing fluid communication among these compartments.

In a third printing mode, at least one of the compartments is filled with liquid from one container and at least one other compartment remains generally empty. This mode can be implemented by allowing at least one compartment to be fed via its inlet port, and preventing fluid communication from at least one compartment which is not fed via its inlet port.

A more detailed description of printing modes according to some embodiments of the present invention is provided in the Examples section the follows (see Examples 2-4).

The printing mode can be selected automatically by computer 54, for example, based on the printing materials that are required for the printing process. Typically, computer 54 selects the printing mode from a predetermined list of printing modes, which list includes at least the first, second and third modes described above.

The printing mode can alternatively be selected by the operator of system 90, e.g., via user interface 16 which can communicate directly with controller 94, or via a user interface of computer 54.

When two or more compartments are filled with liquids from different containers (for example, in the first printing mode), controller 94 can signal valves 92 to simultaneously feed two or more compartments with liquids from different containers.

Alternatively, controller 94 can signal valves 92 to sequentially feed two or more compartments with liquids from different containers. Also contemplated, are embodiments in which the simultaneous and sequential feedings are combined. These embodiments are particularly useful when there are three or more compartments. For example, for one pair of compartments the controller can signal the valves to simultaneously feed the two compartments of the pair, while for another pair of compartments the controller can signal the valves to sequentially feed the two compartments.

In some embodiments of the present invention computer 54 is configured to obtain a ratio among two or more different liquids, respectively contained in two or more separate containers. Computer 54 can then calculate a deposition duty cycle which corresponds to the obtained ratio, and operate controller 94 to feed the respective compartments with the two liquids according to calculated deposition duty cycle. For example, when containers 56a and 56b are used, computer 54 can obtain a ratio A:B that defines a combination having A volumetric parts of the liquid in container 56a and B volumetric parts of the liquid in container 56b. Computer 54 can then calculate a deposition duty cycle corresponding to the ratio A:B.

For example, the calculated deposition duty cycle can be the same as the ratio A:B, wherein for A volumetric parts of liquid that is fed from container 56a into compartment 62a, B volumetric parts of liquid are fed from container 56b into compartment 62b. Computer 54 then operates controller 94 according to the deposition duty cycle, so that head 60 deposits, substantially simultaneously, A volumetric parts of liquid from container 56a and B volumetric parts of liquid from container 56b. Such process can be used for combining the liquids in situ during the deposition process to obtain a desired liquid composition.

In situ mixing is particularly useful when system 90 is a three-dimensional printing system, where the liquids are curable building material that can be combined on the work surface prior to the curing.

The principles and operations of the other components of system 90 are generally as known in the art. Thus, according to an aspect of some embodiments of the present invention there is provided a method of printing. The method comprises receiving printing data and operating system 90 responsively to printing data. The method can print a three-dimensional object. In these embodiments a shape of the three-dimensional object can be obtained, and system 90 can be operated to form a plurality of layers in a configured pattern corresponding to shape. For example, frame 28, leveling device 32, radiation source 26 and tray 30 can be operated for building a three-dimensional object 12 as described above with respect to system 50, except that at least one building material is deposited from printing head 60, as further detailed hereinabove.

As used herein the term "about" refers to ±10%.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find support in the following examples.

EXAMPLES

Reference is now made to the following examples, which together with the above descriptions illustrate some embodiments of the invention in a non limiting fashion.

Example 1

Exemplary Printing System with a Three-Compartment Printing Head

Figure 5:
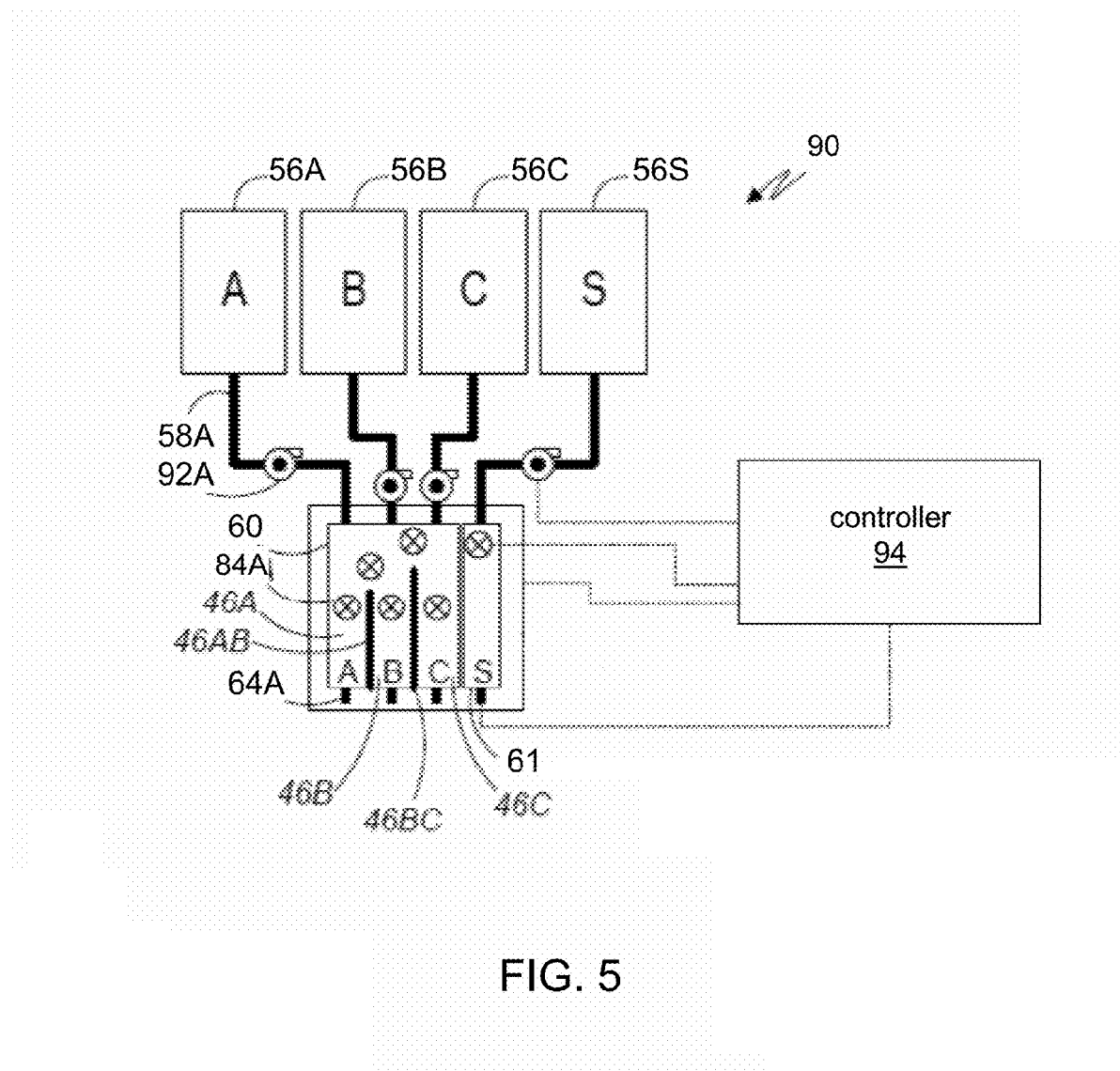
FIG. 5 is a schematic illustration of a printing system incorporating a printing head having three compartments, according to some embodiments of the present invention.

FIG. 5 is a schematic illustration of a printing system 90 having a printing head 60, in an exemplary embodiment of the present invention in which the printing head 60 has three compartments 46A, 46B and 46C. System 90 also comprises a separate printing head 61. Printing head 60 can serve for depositing modeling material(s) and printing head 61 can serve for depositing support material. Compartment 46A is separated from compartment 46B by a partition 46AB, and compartment 46B and compartment 46C are separated by a partition 46BC. Five sensors 84 are shown within head 60. These sensors are used by control unit 94, in cooperation with the ducts 58 the valves 92 associated with containers 56A-C, to determine which of materials A, B or C are actually disposed by each of the three nozzles of head 60. For clarity of presentation only sensor 84A, duct 58A and valve 92A are designated by reference signs.

Exemplary operations of printing heads according to some embodiments of the present invention are described in more detail in the following Examples.

Example 2

Exemplary Operation of a Two-Compartment Printing Head

Figure 6A:
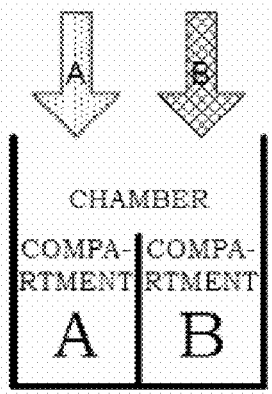
FIGS. 6A-F are schematic illustrations describing the operation of a printing head having two compartments, according to some embodiments of the present invention.
Figure 6B:
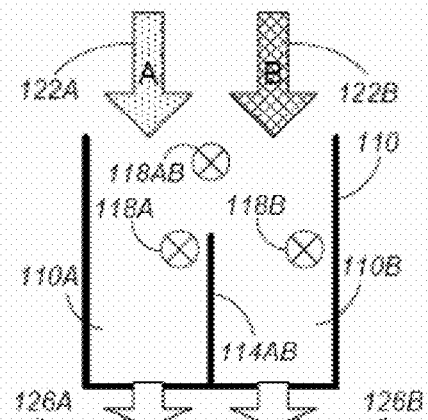

FIGS. 6A-6F are schematic illustrations describing exemplary operation mode of a printing head having two compartments. FIG. 6A illustrates the chamber divided into two compartments and having two feeding options of materials A and/or B. FIG. 6B illustrates chamber 110 divided into two compartments 110A and 110B separated by partition 114AB. Outlet 126A and outlet 126B, which can be in the form of nozzles, are adapted to controllably deposit materials from their respective compartments. Feeders 122A and 122B represent supply containers which controllably add material into the respective compartments. Sensors 118A and 118B are positioned within compartments 110A and 110B, respectively, and below the top of partition 114AB, while sensor 118AB is positioned within chamber 110 above the top of partition 114AB.

Various printing modes according to which the controller (not shown in FIGS. 6A-F, see, e.g., FIG. 5) operates are illustrated in FIGS. 6C-F.

Figure 6C:
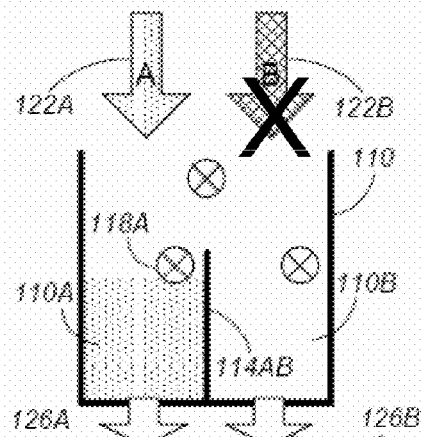

FIG. 6C illustrates a printing mode in which the controller activates only feeder 122A to fill compartment 110A until receiving a signal from sensor 118A. In FIG. 6C, feeder 122B is crossed-out to indicate that in this printing mode, feeder 122B remains inactive (e.g., by switching the valve of the respective supply conduit to its closed state).

Thus, under the scenario of FIG. 6C, only material A is available for printing via outlet 126A, while compartment 110B and outlet 126B remain effectively inactive.

Figure 6D:
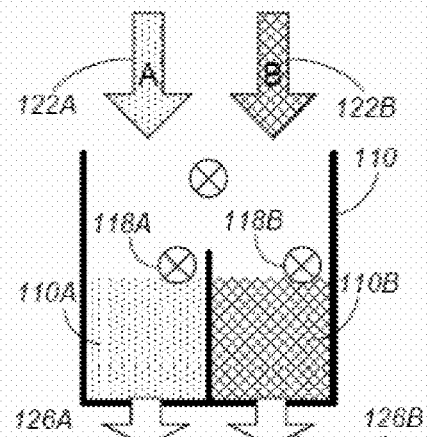

FIG. 6D illustrates a printing mode in which the controller activates feeder 122A fill compartment 110A with material A until receiving a signal from sensor 118A, while feeder 122B is activated to fill compartment 110B with material B until receiving a signal from sensor 118B. The result is that both materials A and B are available for printing via outlet 126A and outlet 126B, respectively.

Figure 6E:
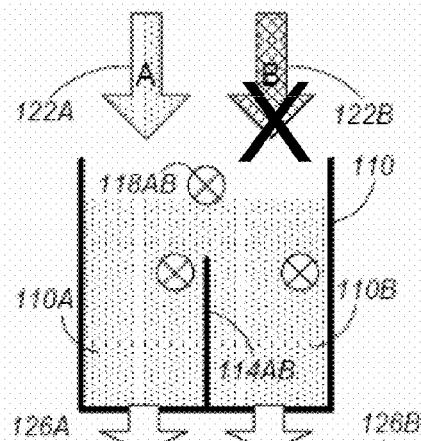

FIG. 6E illustrates a printing mode in which the controller activates only feeder 122A to supply material A until receiving a signal from sensor 118AB. Since sensor 118AB is positioned above the top of partition 114AB, the material A, supplied initially to only compartment 110A, overflows the top of partition 114AB, to fill also compartment 110B. In FIG. 6E, feeder 122B is crossed-out to indicate that in this printing mode, feeder 122B remains inactive. The scenario of FIG. 6E ends up with material A available for printing via both outlets 126A and 126B, leaving feeder 122B, sensor 118A and sensor 118B effectively inactive.

Figure 6F:
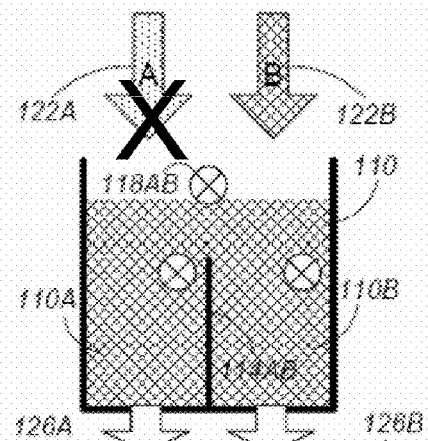

FIG. 6F illustrates a printing mode in which the controller activates only feeder 122B to supply material B until receiving a signal from sensor 118AB. Since sensor 118AB is positioned above the top of partition 114AB, the material B, supplied initially to only compartment 110B, overflows the top of partition 114AB to fill also compartment 110A. In FIG. 6F, feeder 122A is crossed-out to indicate that in this printing mode, feeder 122A remains inactive. The scenario of FIG. 6F ends up with material B available for printing via both outlets 126A and 126B, leaving feeder 122A, sensor 118A and sensor 118B effectively inactive.

It will be appreciated that in the scenarios of FIGS. 6E and 6F, a printing material (A or B, respectively) is available for printing from two outlets while only a single feeder (122A or 122B, respectively) is used, thereby reducing the amount of waste needed when material A or B, respectively, will need to be replaced with another material, thereby reducing the amount of waste.

Table 1, below, is a simplified lookup table that relates to the operation principle of a two-compartment printing head according to some embodiments of the present invention. Table 1 can be better understood with reference to the components illustrated in FIG. 6B, wherein "compartment A" abbreviates compartment 110A, "compartment B" abbreviates compartment 110B, "feeder A" abbreviates feeder 122A, "feeder B" abbreviates feeder 122B, "sensor A" abbreviates sensor 118A, "sensor B" abbreviates sensor 118B, and "sensor AB" abbreviates sensor 118AB.

In Table 1, "feeder A+B" refers to a printing mode in which both feeders 122A and 122B are active, and "sensor A+B" refers to signals received independently from both sensors 118A and 118B.

For example, row 1 of Table 1 relates to the printing mode illustrated in FIG. 6C, wherein only material A is deposited from compartment 110A without filling compartment 110B.

Table 1 defines this printing mode to involve activation of feeder 122A, responsively to signals received only from sensor 118A.

TABLE 1

| Material in Compartment | | | | |
|---|---|---|---|---|
| Compartment A | Compartment B | Feeder(s) | Sensor(s) | FIG. |
| 1 A |   | A | A | 6C |
| 2   | B | B | B | — |
| 3 A | B | A + B | A + B | 6D |
| 4 A | A | A | AB | 6E |
| 5 B | B | B | AB | 6F |

Example 3

Exemplary Operation of a Three-Compartment Printing Head

FIG. 7A illustrates a side view of a chamber that includes three compartments that can individually and selectively be fed with three materials A, B and C from respective feeders. For example, the chamber can enact or be used in printing head 60 shown in FIGS. 4B and 5. In the more detailed view of FIG. 7B, chamber 210 is divided into compartments 210A-C, that can be individually fed with materials A, B or C via feeders 222A-C, respectively. Outlets 226A-C are adapted to controllably deposit material from their respective compartments. Partition 114AB separates between compartments 210A and 210B, while partition 114BC separates between compartments 210B and 210C. In the present Example, partition 114BC is higher than partition 114AB. This configuration allows independent control over the fluid communication between the compartments as will now be explained.

Sensor 218A and sensor 218B are positioned below the top of partition 114AB, and sensor 218C is positioned below the top of partition 114BC. Sensor 218AB is positioned above the top of partition 114AB but below the top of partition 114BC, and sensor 218ABC is positioned above the top of both partition 114AB and partition 114BC.

Various printing modes according to which the controller (not shown in FIGS. 7A-F, see, e.g., FIG. 5) operates are illustrated in FIGS. 7C-F. For clarity of presentation, some of the reference numerals of FIG. 7B may be absent in FIGS. 7C-7F.

The reference numerals of FIG. 7B should be used to interpret the description of FIGS. 7C-7F, where appropriate.

FIG. 7C illustrates a printing mode in which the controller activates feeders 222A-C to fill compartments 210A-C with materials A, B, and C, respectively. Sensors 218A-C send signals to the control unit for stopping the operation of their respective feeders when the respective material reaches the sensor level. Thus, in the scenario of FIG. 7C, all three materials A, B and C are deposited through outlets 226A-C, respectively.

FIG. 7D illustrates a printing mode in which the controller activates feeder 222C and receives signals from sensor 218C to fill compartment 210C with material C, while feeder 222A and sensor 218AB are involved to fill both compartments 210A and 210B with the same material A, by allowing overflow of material A over partition 114AB (but not over partition 114BC). In FIG. 7D, feeder 222B is crossed-out to indicate that in this printing mode, feeder 222B remains inactive.

FIG. 7E illustrates a printing mode which is similar to the printing mode illustrated in FIG. 7D, except that compartments A and B are filled with material B.

Hence, the controller activates feeder 222C and receives signals from sensor 218C to fill compartment 210C with material C, while feeder 222B and sensor 218AB are involved to fill both compartments 210A and 210B with the same material B, including a spill-over of material B over partition 114AB. In FIG. 7E, feeder 222A is crossed-out to indicate that in this printing mode, feeder 222A remains inactive.

FIG. 7F illustrates a printing mode in which the controller activates feeder 222A and receives signals from sensor 218ABC to fill all three compartments 210A-C with the same material A, including an overflow of material A over both partitions 114AB and 114BC. In FIG. 7F, feeders 222B and 222C are crossed-out to indicate that in this printing mode, feeders 222B and 222C remain inactive.

It is to be understood that the printing modes illustrated in FIGS. 7A-7F are representative examples only, and that other printing modes are not excluded from the scope of the present invention. For example, all three compartments 210A-C can be filled with the same material B (by activating feeder 222B but not feeders 222A and 222C), or by the same material C (by activating feeder 222C but not feeders 222A and 222B), similarly to the printing mode illustrated in FIG. 7F.

Also contemplated are embodiments in which partitions 114AB and 114BC can be made of generally the same height. In these embodiments it is not necessary for the printing head to include sensor 218AB, and independent fluid communication between compartments 210A and 210B can be absent or, alternatively, achieved by other means (see, for example, FIGS. 2B-C).

Table 2, below, is a simplified lookup table that relates to the operation principle of a three-compartment printing head according to some embodiments of the present invention. Table 2 can be better understood with reference to the components illustrated in FIG. 7B, wherein "compartment A" abbreviates compartment 210A, "compartment B" abbreviates compartment 210B, "compartment C" abbreviates compartment 210C, "feeder A" abbreviates feeder 222A, "feeder B" abbreviates feeder 222B, "feeder C" abbreviates feeder 222C, "sensor A" abbreviates sensor 218A, "sensor B" abbreviates sensor 218B, "sensor C" abbreviates sensor 218C, "sensor AB" abbreviates sensor 218AB, and "sensor ABC" abbreviates sensor 218ABC.

In Table 2, "feeder A+B" refers to a printing mode in which both feeders 222A and 222B are active and feeder 222C is inactive, "feeder A+C" refers to a printing mode in which both feeders 222A and 222C are active and feeder 222B is inactive, "feeder B+C" refers to a printing mode in which both feeders 222B and 222C are active and feeder 222A is inactive, "feeder A+B+C" refers to a printing mode in which all feeders 222A-C are active, "sensor A+B" refers to signals received independently from both sensors 218A and 218B, "sensor A+C" refers to signals received independently from both sensors 218A and 218C, "sensor B+C" refers to signals received independently from both sensors 218B and 218C, and "sensor A+B+C" refers to signals received independently from all sensors 218A-C.

TABLE 2

| | Material in Compartment | | | Feeder(s) | Sensor(s) | FIG. |
|---|---|---|---|---|---|---|
| | Comp. A | Comp. B | Comp. C | | | |
| 1 | A | | | A | A | |
| 2 | | B | | B | B | |
| 3 | | | C | C | C | |
| 4 | A | B | | A + B | A + B | |
| 5 | A | | C | A + C | A + C | |
| 6 | | B | C | B + C | B + C | |
| 7 | A | B | C | A + B + C | A + B + C | 7C |
| 8 | A | A | | A | AB | |
| 9 | B | B | | B | AB | |
| 10 | A | A | C | A + C | AB + C | 7D |
| 11 | B | B | C | B + C | AB + C | 7E |
| 12 | A | A | A | A | ABC | 7F |
| 13 | B | B | B | B | ABC | |
| 14 | C | C | C | C | ABC | |

Example 4

Exemplary Operation of a Four-Compartment Printing Head

Figure 8A:
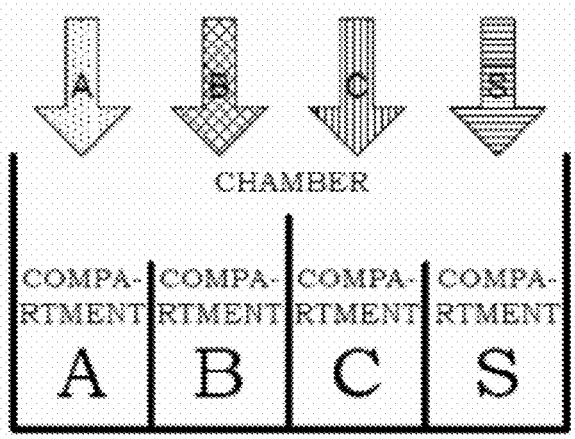
FIGS. 8A-C are schematic illustrations describing the operation of a printing head having four compartments, according to some embodiments of the present invention.
Figure 8B:
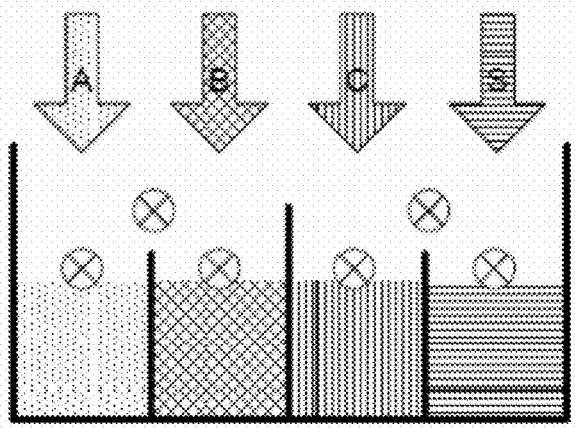
Figure 8C:
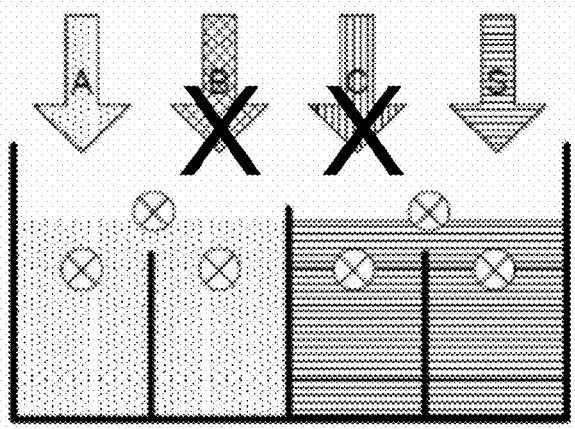

FIGS. 8A-C are schematic illustrations describing some printing modes of a four-compartment printing head, according to some embodiments of the present invention.

FIG. 8A illustrate a side view of the printing head, with four compartments referred to in FIG. 8A as compartments A, B, C and S. One or more of compartments A, B, C and S can be employed for depositing support material(s) while the other compartments can be employed for depositing modeling material(s).

FIG. 8B illustrates a printing mode in which all four feeders are activated to feed materials A, B, C and S into the respective compartments, until receiving signals from all four lower-level sensors. Any of materials A, B, C and S can be either a modeling material or a support material. For example, in some embodiments of the present invention materials A, B, C are (preferably different) modeling materials, and material S is a support material; in some embodiments of the present invention materials A and B are (preferably different) modeling materials, and materials C and S are (preferably different) support materials; in some embodiments of the present invention materials A, B, C are (preferably different) support materials, and material S is a modeling material; in some embodiments of the present invention all materials are (preferably different) modeling materials, in some embodiments of the present invention all materials are (preferably different) support materials.

FIG. 8C illustrates a printing mode in which only material A and material S are fed via the respective feeders. For example, material A can be a modeling material and material S can be a support material. Fluid communication is established by overflow between compartments A and B, and between compartments C and S, but not between compartments B and C. The higher center partition and the two higher level sensors serve to prevent or disestablish the separation between compartments B and C. In FIG. 8C, feeders B and C are crossed-out to indicate that in this printing mode, feeders B and C remain inactive.

In some embodiments of the present invention at least one of compartments A, B, C and S remains empty and inactive, as described in greater details in Examples 2 and 3 above.

While the invention has been described with respect to a limited number of embodiments, it will be appreciated by persons skilled in the art that the present invention is not limited by what has been particularly shown and described herein.

Rather the scope of the present invention includes both combinations and sub-combinations of the various features described herein, as well as variations and modifications which would occur to persons skilled in the art upon reading the specification and which are not in the prior art.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A printing head for a printing system, the printing system having a material supply apparatus for supplying liquid material to said printing head, the material supply apparatus comprises a plurality of separate liquid containers, the printing head comprising:
a plurality of compartments, each having an outlet port for depositing the liquid on a supporting structure and an inlet port separately connectable to a separate liquid container of the material supply apparatus, wherein at least two compartments are in controllable and direct fluid communication with each other; and
an arrangement of sensors configured for generating signals indicative of (i) a filling state of each compartment, and (ii) a fluid communication state between said at least two compartments;
wherein said at least two compartments occupy a chamber and are separated by at least a partition, and wherein said fluid communication is via a liquid passage in said chamber.

2. The printing head according to claim 1, wherein said liquid passage is between an upper end of said partition and an upper wall of said chamber.

3. The printing head according to claim 1, wherein said partition is movable to form said liquid passage.

4. The printing head according to claim 1, wherein said liquid passage comprises a controllable inter-compartment valve.

5. The printing head according to claim 1, wherein said arrangement of sensors comprises at least a first sensor in a first compartment of said at least two compartments, a second sensor in a second compartment of said at least two compartments, and a third sensor in said liquid passage.

6. The printing head according to claim 1, wherein said plurality of compartments comprises only two compartments.

7. The printing head according to claim 1, wherein said plurality of compartments comprises at least three compartments.

8. The printing head according to claim 7, wherein said controllable fluid communication comprises at least a first fluid communication between a first pair of compartments, and a second fluid communication between a second pair of compartments, and wherein at least said first fluid communication is controllable independently from said second fluid communication.

9. The printing head according to claim 7, wherein said at least three compartments are arranged serially, and wherein each said controllable fluid communication is between every two adjacent compartments.

10. The printing head according to claim 7, wherein said at least three compartments are arranged serially in a chamber and are separated by a plurality of partitions, and wherein at least two of said partitions are of different heights.

11. The printing head according to claim 1, wherein said plurality of compartments comprises at least four compartments.

12. A printing system, comprising:
a printing head according to claim 1;
the plurality of separate liquid containers, each being separately connected to a respective compartment by a conduit having a controllable valve therein; and
a controller configured for controlling each valve of each conduit responsively to said signals from said sensors.

13. The printing system according to claim 12, further comprising a computer for operating said controller according to a printing mode selected from the group consisting of at least:
a first printing mode in which at least two compartments are filled with liquids from different containers,
a second printing mode in which at least two compartments are filled with liquid from the same container, and
a third printing mode in which at least one compartment is filled with liquid from one container and at least one compartment remains generally empty.

14. The printing system according to claim 13, wherein in at least said first printing mode, said controller signals said valves so as to simultaneously feed at least two of said compartments with liquids from different containers.

15. The printing system according to claim 13, wherein in at least said first printing mode, said controller signals said valves so as to sequentially feed at least two of said compartments with liquids from different containers.

16. The printing system according to claim 13, wherein said computer is configured to obtain a ratio between at least two different liquids respectively contained in at least two separate containers, to calculate a deposition duty cycle of said at least two different liquids corresponding to said ratio, and to operate said controller to feed at least two of said compartments with said two liquids according to said calculated deposition duty cycle.

17. The printing system according to claim 12, being a three-dimensional printing system wherein at least two liquid containers contain different modeling materials.

18. The printing system according to claim 17, wherein at least one of said liquid containers contains a support material.

19. The printing system according to claim 17, wherein at least two of said liquid containers contain different support materials.

20. The printing system according to claim 17, further comprising a separate printing head connected to a liquid container containing a support material.

21. A method of printing, comprising:
receiving printing data, and
operating a printing system responsively to said printing data;
wherein said printing system comprises the printing head according to claim 1, and further comprises the plurality of separate liquid containers, each being separately connected to a respective compartment of the printing head by a conduit having a controllable valve therein; and
wherein said operating comprises controlling each valve of each conduit responsively to said signals from said sensors.

22. A method of printing a three-dimensional object, comprising:
receiving a shape of the three-dimensional object, and
operating a three-dimensional printing system to form a plurality of layers in a configured pattern corresponding to said shape;
wherein said three-dimensional printing system comprises the printing head according to claim 1, and further comprises the plurality of separate liquid containers each being separately connected to a respective compartment of the printing head by a conduit having a controllable valve therein, wherein at least two liquid containers contain different modeling materials; and
wherein said operating comprises controlling each valve of each conduit responsively to said signals from said sensors.

23. A method of printing using a printing system having a material supply apparatus and a printing head, the method comprising:
by the material supply apparatus, feeding at least one printing material into the printing head, wherein the printing head has a plurality of compartments each having an outlet port and an inlet port separately connectable to a separate liquid container of the material supply apparatus, said feeding being while controlling direct fluid communication among at least two of said compartments, wherein said at least two compartments occupy a chamber and are separated by at least a partition, and wherein said fluid communication is via a liquid passage in said chamber, and wherein the printing head comprises an arrangement of sensors configured for generating signals indicative of (i) a filling state of each compartment, and (ii) a fluid communication state between said at least two compartments; and
using said outlet ports for depositing said at least one printing material onto a receiving surface.

24. The method according to claim 23, wherein said feeding comprises feeding at least two compartments with different printing materials.

25. The method according to claim 23, wherein said controlling said fluid communication comprises establishing flow of printing material between at least two compartments such as to fill said at least two compartments with the same printing material.

26. The method according to claim 25, wherein said feeding comprises feeding at least two compartments with different printing materials.

27. The method according to claim 23, wherein said feeding and said controlling comprise preventing flow of printing material into at least one compartment, such that said at least one compartment remains generally empty while at least one other compartment is filled with said printing material.

28. The method according to claim 23, wherein said at least one printing material comprises at least one modeling material and at least one support material, and wherein said depositing is executed to form a plurality of layers in a configured pattern corresponding to a shape of a three-dimensional object.

29. The method according to claim 28, wherein said at least one modeling material comprises at least two modeling materials and wherein said feeding comprises feeding at least two compartments with different modeling materials.

\* \* \* \* \*